United States Patent
Xiao et al.

(10) Patent No.: US 11,094,996 B2
(45) Date of Patent: Aug. 17, 2021

(54) ADDITIVE TO CERAMIC ION CONDUCTING MATERIAL TO MITIGATE THE RESISTIVE EFFECT OF SURFACE CARBONATES AND HYDROXIDES

(71) Applicant: GM GLOBAL TECHNOLOGY OPERATIONS LLC, Detroit, MI (US)

(72) Inventors: Xingcheng Xiao, Troy, MI (US); Robert D. Schmidt, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 174 days.

(21) Appl. No.: 16/575,143

(22) Filed: Sep. 18, 2019

(65) Prior Publication Data
US 2021/0083249 A1   Mar. 18, 2021

(51) Int. Cl.
H01M 50/403 (2021.01)
H01M 4/1393 (2010.01)
H01M 4/36 (2006.01)
H01M 4/04 (2006.01)
H01M 50/449 (2021.01)

(52) U.S. Cl.
CPC ....... *H01M 50/403* (2021.01); *H01M 4/0471* (2013.01); *H01M 4/1393* (2013.01); *H01M 4/366* (2013.01); *H01M 50/449* (2021.01)

(58) Field of Classification Search
None
See application file for complete search history.

(56) References Cited

U.S. PATENT DOCUMENTS

| | | |
|---|---|---|
| 8,974,946 B2 | 3/2015 | Cai et al. |
| 9,123,939 B2 | 9/2015 | Xiao et al. |
| 9,160,036 B2 | 10/2015 | Yang et al. |
| 9,252,411 B2 | 2/2016 | Abd Elhamid et al. |
| 9,302,914 B2 | 4/2016 | Liu et al. |
| 9,362,552 B2 | 6/2016 | Sohn et al. |
| 9,373,829 B2 | 6/2016 | Xiao et al. |

(Continued)

FOREIGN PATENT DOCUMENTS

| | | |
|---|---|---|
| NO | 2017045573 A1 | 3/2017 |
| WO | 2014182281 A1 | 11/2014 |

OTHER PUBLICATIONS

Chen et al. "Electrolyte design for LiF-ricj solid-electrolyte interfaces to enable high-performance microsized alloy anodes for batteries." Nature Energy, 5 386-397 (2020). (Year: 2020).*

Yersak, Thomas A. et al., U.S. Appl. No. 15/992,878, filed May 30, 2018 entitled, "Methods of Manufacturing High-Active-Material-Loading Composite Electrodes and All-Solid-State Batteries Including Composite Electrodes," 55 pages.

(Continued)

*Primary Examiner* — Alix E Eggerding
(74) *Attorney, Agent, or Firm* — Harness, Dickey & Pierce, P.L.C.

(57) ABSTRACT

A method of modifying a carbonate layer formed on a surface of an electrochemical cell component is provided. The surface includes a ceramic oxide. The carbonate layer includes a carbonate and is substantially non-conductive to lithium ions and sodium ions. The method includes contacting the carbonate layer with a modifying agent to form a mixture and causing the modifying agent to incorporate into the carbonate layer and form a modified hybrid layer including a eutectic mixture of the modifying agent and the carbonate. The modified hybrid layer is conductive to lithium ions and sodium ions.

20 Claims, 4 Drawing Sheets

(56) References Cited

U.S. PATENT DOCUMENTS

| | | |
|---|---|---|
| 9,437,871 B2 | 9/2016 | Zhou et al. |
| 9,537,144 B2 | 1/2017 | Huang et al. |
| 9,647,254 B2 | 5/2017 | Dadheech et al. |
| 9,742,028 B2 | 8/2017 | Zhou et al. |
| 9,896,763 B2 | 2/2018 | Dadheech et al. |
| 9,905,847 B2 | 2/2018 | Dadheech et al. |
| 9,923,189 B2 | 3/2018 | Xiao |
| 9,929,435 B2 | 3/2018 | Cai et al. |
| 9,979,008 B2 | 5/2018 | Dai et al. |
| 9,985,284 B2 | 5/2018 | Dadheech et al. |
| 10,084,204 B2 | 9/2018 | Dai et al. |
| 10,128,481 B2 | 11/2018 | Xiao et al. |
| 10,141,559 B2 | 11/2018 | Xiao et al. |
| 10,199,643 B2 | 2/2019 | Zhou et al. |
| 10,312,501 B2 | 6/2019 | Yang et al. |
| 10,326,166 B2 | 6/2019 | Yang et al. |
| 2015/0056387 A1 | 2/2015 | Dadheech et al. |
| 2015/0056493 A1 | 2/2015 | Dadheech et al. |
| 2015/0056507 A1 | 2/2015 | Dadheech et al. |
| 2015/0349307 A1 | 12/2015 | Dadheech et al. |
| 2016/0172706 A1 | 6/2016 | Xiao et al. |
| 2016/0172710 A1 | 6/2016 | Liu et al. |
| 2017/0162859 A1 | 6/2017 | Yang et al. |
| 2017/0214079 A1 | 7/2017 | Dai et al. |
| 2017/0271678 A1 | 9/2017 | Yang et al. |
| 2017/0288230 A1 | 10/2017 | Yang et al. |
| 2017/0338490 A1 | 11/2017 | Xiao et al. |
| 2018/0287207 A1 | 10/2018 | Dai et al. |
| 2018/0309165 A1 | 10/2018 | Yersak et al. |
| 2018/0309166 A1 | 10/2018 | Yersak et al. |
| 2018/0375148 A1 | 12/2018 | Yersak et al. |
| 2019/0044186 A1* | 2/2019 | Kim ............ H01M 10/058 |
| 2020/0112050 A1* | 4/2020 | Hu ............... H01B 1/08 |

OTHER PUBLICATIONS

Yersak, Thomas A. et al., U.S. Appl. No. 16/164,525, filed Oct. 18, 2018 entitled, "Low-Expansion Composite Electrodes for All-Solid-State Batteries," 53 pages.

Cheng, Lei et al., "The origin of high electrolyte-electrode interfacial resistances in lithium cells containing garnet type solid electrolytes," Phys. Chem. Chem. Phys., 204, 16, pp. 18294-18300; DOI: 10.1039/c4cp02921f (Published Jul. 24, 2014).

Boulant, Anthony et al., "Reaction mechanisms of Li0.30La0.57TiO3 powder with ambient air: H+/Li+ exchange with water and Li2CO3 formation," Dalton Trans., 2010, 39, pp. 3968-3975; DOI: 10.1039/b924686c (Published online Mar. 16, 2010).

Sharafi, Asma et al., "Surface Chemistry Mechanism of Ultra-Low Interfacial Resistance in the Solid-State Electrolyte Li7La3Zr2O12," Chem. Mater. (29) 18, pp. 7961-7968; DOI: 10.1021/acs.chemmater7b03002 (Published Sep. 1, 2017).

Tetenbaum, M. et al., "Vaporization of Lithium Oxide: Effect of Water Vapor in Helium Carrier Gas," Journal of Nuclear Materials, 120 (1984), pp. 213-216; DOI: 10.1016/0022-3115(84)90058-8.

Sharafi, Asma et al., "Impact of air exposure and surface chemistry on Li—Li7La3Zr2O12 interfacial resistance," J. Mater. Chem. A., 2017, 5, pp. 13475-13487; DOI: 10.1039/c7ta03162a (Published Jun. 15, 2017).

Han, Fudong et al., "High electronic conductivity as the origin of lithium dendrite formation within solid electrolytes," Nature Energy, 4, pp. 187-196; DOI: 10.1038/s41560-018-0312-z (Published Jan. 14, 2019).

Cheng, Eric Jianfeng et al., "Intergranular Li metal propagation through polycrystalline Li6.25Al0.25La3Zr2O12 ceramic electrolyte," Electrochemica Acta, 223 (2017), pp. 85-91; DOI: 10.1016/j.electacta.2016.12.018 (Published online Dec. 6, 2016).

* cited by examiner

ADDITIVE TO CERAMIC ION CONDUCTING MATERIAL TO MITIGATE THE RESISTIVE EFFECT OF SURFACE CARBONATES AND HYDROXIDES

INTRODUCTION

This section provides background information related to the present disclosure which is not necessarily prior art.

Electrochemical energy storage devices, such as lithium-ion batteries, can be used in a variety of products, including automotive products, such as start-stop systems (e.g., 12V start-stop systems), battery-assisted systems ("μBAS"), Hybrid Electric Vehicles ("HEVs"), and Electric Vehicles ("EVs"). Typical lithium-ion batteries include two electrodes, a separator, and an electrolyte. Lithium-ion batteries may also include various terminal and packaging materials. One of the two electrodes serves as a positive electrode or cathode, and the other electrode serves as a negative electrode or anode. Conventional rechargeable lithium-ion batteries operate by reversibly passing lithium ions back and forth between the negative electrode and the positive electrode. For example, lithium ions may move from the positive electrode to the negative electrode during charging of the battery and in the opposite direction when discharging the battery. A separator and/or electrolyte may be disposed between the negative and positive electrodes. The electrolyte is suitable for conducting lithium ions (or sodium ions in the case of sodium-ion batteries) between the electrodes and, like the two electrodes, may be in a solid form, a liquid form, or a solid-liquid hybrid form. In the instances of solid-state batteries, which include a solid-state electrolyte disposed between solid-state electrodes, the solid-state electrolyte physically separates the electrodes so that a distinct separator is not required.

Solid-state batteries have advantages over batteries that include a separator and a liquid electrolyte. These advantages include a longer shelf life with lower self-discharge, simpler thermal management systems, a reduced need for packaging, and the ability to operate at a higher energy density within a wider temperature window.

Many prototypical solid-state batteries have an oxide-based solid-state electrolyte. One such electrolyte is $Li_7La_3Zr_2O_{12}$ (LLZO), which has a high room temperature ionic conductivity ranging from $10^{-3}$-$10^{-4}$ S/cm and good chemical stability. However, LLZO reacts with atmospheric water and carbon dioxide to form a surface layer of lithium carbonate ($Li_2CO_3$), which coats LLZO particles. Lithium from LLZO also reacts with atmospheric water to generate additional $Li_2CO_3$, which results in a loss of LLZO lithium. The $Li_2CO_3$ coating does not adequately conduct lithium ions and results in a high interfacial impedance. Although $Li_2CO_3$ can be decomposed by sintering at high temperatures of over 1000° C., this method results in an additional loss of lithium due to evaporation at this high temperature and generates surface contaminants. One such surface contaminant is carbon, which is electronically conductive and promotes dendrite formation. Accordingly, new methods of addressing carbonate layers formed on oxide-based solid-state electrolyte particles are desired.

SUMMARY

This section provides a general summary of the disclosure, and is not a comprehensive disclosure of its full scope or all of its features.

In various aspects, the current technology provides a method of modifying a carbonate layer formed on a surface of an electrochemical cell component, the surface including a ceramic oxide and the carbonate layer including a carbonate and being substantially non-conductive to lithium ions, sodium ions, or a combination thereof, the method including contacting the carbonate layer with a modifying agent to form a mixture and causing the modifying agent to incorporate into the carbonate layer and to form a modified hybrid layer including a eutectic mixture of the modifying agent and the carbonate, the modified hybrid layer being conductive to lithium ions, sodium ions, or a combination thereof.

In one aspect, the modifying agent includes MX, where M is an alkali metal and X is a halide.

In one aspect, the modifying agent includes LiF or NaF.

In one aspect, the causing the modifying agent to incorporate into the carbonate layer includes heating the mixture at a temperature greater than or equal to about 300° C.

In one aspect, the heating includes heating the mixture at a temperature greater than or equal to about 300° C. to less than or equal to about 400° C.

In one aspect, the electrochemical cell component is a green solid-state electrolyte and the heating includes sintering the mixture at a temperature greater than or equal to about 600° C. to less than or equal to about 1200° C. to form a densified solid-state electrolyte structure.

In one aspect, the green solid-state electrolyte includes a plurality of ceramic oxide-based solid-state electrolyte particles in powder form, wherein at least a portion of each solid-state electrolyte particle of the plurality is coated with the carbonate layer.

In one aspect, the ceramic oxide includes $Li_7La_3Zr_2O_{12}$ (LLZO), $Li_xLa_yTiO_3$ where $0<x<1$ and $0<y<1$ (LLTO), $Li_{1+x}Al_yTi_{2-y}PO_4$ where $0<x<1$ and $0<y<2$ (LATP), $Li_{2+2x}Zn_{1-x}GeO_4$ where $0<x<1$ (LISICON), $Li_2PO_2N$ (LIPON), sodium equivalents thereof, or combinations thereof and the ceramic oxide is optionally doped with aluminum, tantalum, niobium, gallium, indium, tin, antimony, bismuth, yttrium, germanium, calcium, strontium, barium, hafnium, or combinations thereof.

In one aspect, the carbonate includes lithium carbonate ($Li_2CO_3$), sodium carbonate ($Na_2CO_3$), or a combination thereof.

In one aspect, the contacting and the causing the modifying agent to incorporate into the carbonate layer are performed substantially simultaneously by atomic layer deposition.

In one aspect, the electrochemical cell component including the modified hybrid layer is substantially free of electronically conductive carbon residues.

In one aspect, the method further includes pressing the mixture in a die defining a predetermined shape and performing the heating during the pressing.

In one aspect, the electrochemical cell component is a separator including the ceramic oxide or a coating including the ceramic oxide disposed on a polymeric separator.

In one aspect, the method further includes incorporating the electrochemical cell component into an electrochemical cell.

In various aspects, the current technology also provides a method of modifying a carbonate layer formed on a surface of an electrochemical cell component, the surface including a ceramic oxide and the carbonate layer including lithium carbonate ($Li_2CO_3$), sodium carbonate ($Na_2CO_3$), or a combination thereof and being substantially non-conductive to lithium ions, sodium ions, or a combination thereof, the method including contacting the carbonate layer of with a modifying agent including MX, where M is Na or Li and X is a halide, to form a mixture; pressing the mixture in a die defining a predetermined shape; and during the pressing, heating the mixture at a temperature greater than or equal to about 300° C. to incorporate the modifying MX into the carbonate layer and to form a modified hybrid layer including a eutectic mixture of the MX and the $Li_2CO_3$, $Na_2CO_3$, or combination thereof, the modified hybrid layer being conductive to lithium ions, sodium ions, or a combination thereof.

In one aspect, the predetermined shape is a wafer, a disk, a sheet, a parallelepiped, a cylinder, a cube, a sphere, or a pellet.

In one aspect, the electrochemical cell component is a solid-state electrolyte, a separator, a coating disposed on a separator, a positive electrode including a positive electrode active material having a solid-state electrolyte having the ceramic oxide embedded therein, or a negative electrode including a negative electrode active material having a solid-state electrolyte including the ceramic oxide embedded therein.

In various aspects, the current technology further provides a method of modifying a carbonate layer formed on a surface of an electrochemical cell component, the surface including a ceramic oxide and the carbonate layer including lithium carbonate ($Li_2CO_3$), sodium carbonate ($Na_2CO_3$), or a combination thereof and being substantially non-conductive to ions, the method including contacting the carbonate layer of with a modifying agent including LiF, NaF, or a combination thereof to form a mixture and causing the modifying agent to incorporate into the carbonate layer and to form a modified hybrid layer including a eutectic mixture of the LiF, NaF, or the combination thereof and the carbonate, the modified hybrid layer having an ionic conductivity of greater than or equal to about 0.1 mS, wherein the ceramic oxide is optionally doped and includes $Li_7La_3Zr_2O_{12}$ (LLZO), $Li_xLa_yTiO_3$ where $0<x<1$ and $0<y<1$ (LLTO), $Li_{1+x}Al_yTi_{2-y}PO_4$ where $0<x<1$ and $0<y<2$ (LATP), $Li_{2+2x}Zn_{1-x}GeO_4$ where $0<x<1$ (LISICON), $Li_2PO_2N$ (LIPON), sodium equivalents thereof, or combinations thereof, and wherein the electrochemical cell component is a solid-state electrolyte, a separator, or a coating disposed on a separator.

In one aspect, the causing the modifying agent to incorporate into the carbonate layer includes heating the mixture at a temperature greater than or equal to about 300° C. or the contacting and the causing the modifying agent to incorporate into the carbonate layer are performed substantially simultaneously by atomic layer deposition.

In one aspect, the electrochemical cell component is a separator including the ceramic oxide, a coating including the ceramic oxide disposed on a polymeric separator, or a solid-state electrolyte including the ceramic oxide, and the method further includes disposing the electrochemical cell component between a negative electrode having negative electrode active particles and a positive electrode having positive electrode active particles, wherein the negative electrode active particles and the positive electrode active articles are independently mixed with no electrolyte, with solid-state electrolyte particles, or with a liquid electrolyte solution.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
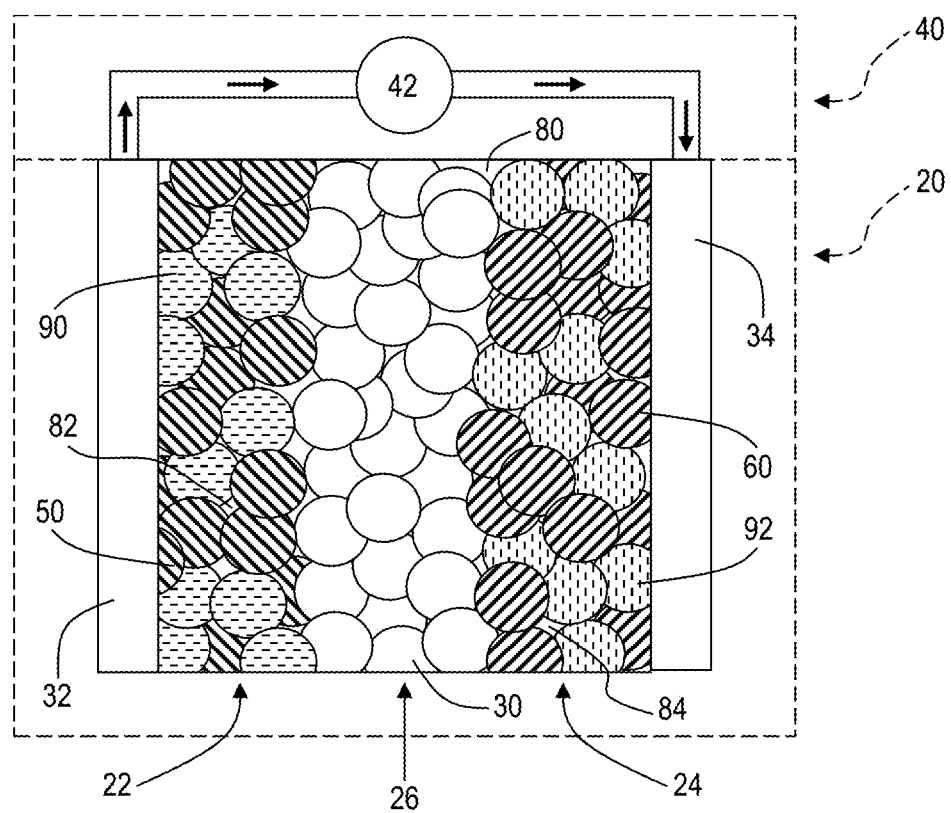
FIG. 1 is an illustration of a solid-state battery in accordance with various aspects of the current technology.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The current technology provides methods of modifying carbonate layers formed on ceramic oxide components of electrochemical cells, such as oxide-based solid-state electrolyte particles used as solid-state electrolytes or separators and oxide-based ceramic coatings on separators. The carbonate layers comprise a carbonate, such as lithium carbonate ($Li_2CO_3$), sodium carbonate ($Na_2CO_3$), or a combination thereof. In various aspects, the carbonate may alternatively, or also, include potassium carbonate ($K_2CO_3$), magnesium carbonate ($MgCO_3$), and/or calcium carbonate ($CaCO_3$). The methods do not remove the carbonate from the ceramic oxide components. Rather, the carbonate is combined with a modifying agent to form a new hybrid eutectic layer that is conductive to ions.

An exemplary and schematic illustration of an all-solid-state electrochemical cell 20 (also referred to herein as "the battery"), i.e., a lithium-ion or sodium-ion cell, that cycles lithium ions or sodium ions is shown in FIG. 1. Unless specifically indicated otherwise, the term "ions" as used herein refers to lithium ions or sodium ions. The battery 20 includes a negative electrode 22, a positive electrode 24, and a solid-state electrolyte 26 disposed between the electrodes 22, 24. The solid-state electrolyte 26 is both a separator that physically separates the negative electrode 22 from the positive electrode 24 and an ion-conducting electrolyte. The solid-state electrolyte 26 may be defined by a first plurality of solid-state electrolyte particles 30. A second plurality of solid-state electrolyte particles or a first liquid electrolyte (i.e., an anolyte) 90 and/or a third plurality of solid-state electrolyte particles or a second liquid electrolyte (i.e., a catholyte) 92 may also be mixed with negative solid-state electroactive particles 50 and positive solid-state electroactive particles 60 present in the negative electrode 22 and the positive electrode 24, respectively, to form a continuous electrolyte network, which may be a continuous solid-state electrolyte network or a solid-liquid hybrid electrolyte network. For example, the negative solid-state electroactive particles 50 and the positive solid-state electroactive particles 60 are independently mixed with no electrolyte, with the second/third solid-state electrolyte particles 90, 92, or with the first/second liquid electrolyte 90, 92.

A negative electrode current collector 32 may be positioned at or near the negative electrode 22, and a positive electrode current collector 34 may be positioned at or near the positive electrode 24. The negative electrode current collector 32 and the positive electrode current collector 34 respectively collect and move free electrons to and from an external circuit 40 (as shown by the block arrows). For example, an interruptible external circuit 40 and a load device 42 may connect the negative electrode 22 (through the negative electrode current collector 32) and the positive electrode 24 (through the positive electrode current collector 34). Composite electrodes can also include an electrically conductive diluent, such as carbon black or carbon nanotubes, that is dispersed throughout materials that define the negative electrode 22 and/or the positive electrode 24.

The battery 20 can generate an electric current (indicated by the block arrows) during discharge by way of reversible electrochemical reactions that occur when the external circuit 40 is closed (to connect the negative electrode 22 and the positive electrode 24) and when the negative electrode 22 contains a relatively greater quantity of lithium or sodium. The chemical potential difference between the negative electrode 22 and the positive electrode 24 drives electrons produced by the oxidation of inserted lithium or sodium at the negative electrode 22 through the external circuit 40 towards the positive electrode 24. Ions, which are also produced at the negative electrode 22, are concurrently transferred through the solid-state electrolyte 26 towards the positive electrode 24. The electrons flow through the external circuit 40, and the ions migrate across the solid-state electrolyte 26 to the positive electrode 24, where they may be plated, reacted, or intercalated. The electric current passing through the external circuit 40 can be harnessed and directed through the load device 42 (in the direction of the block arrows) until the lithium or sodium in the negative electrode 22 is depleted and the capacity of the battery 20 is diminished.

The battery 20 can be charged or reenergized at any time by connecting an external power source (e.g., charging device) to the battery 20 to reverse the electrochemical reactions that occur during battery discharge. The connection of the external power source to the battery 20 compels the non-spontaneous oxidation of one or more metal elements at the positive electrode 24 to produce electrons and ions. The electrons, which flow back towards the negative electrode 22 through the external circuit 40, and the ions, which move across the solid-state electrolyte 26 back towards the negative electrode 22, reunite at the negative electrode 22 and replenish it with lithium or sodium for consumption during the next battery discharge cycle. As such, each discharge and charge event is considered to be a cycle, where ions are cycled between the positive electrode 24 and the negative electrode 22.

The external power source that may be used to charge the battery 20 may vary depending on size, construction, and particular end-use of the battery 20. Some notable and exemplary external power sources include, but are not limited to, AC power sources, such as AC wall outlets and motor vehicle alternators. In many of the configurations of the battery 20, each of the negative electrode current collector 32, the negative electrode 22, the solid-state electrolyte 26, the positive electrode 24, and the positive electrode current collector 34 are prepared as relatively thin layers (for example, from several microns to a millimeter or less in thickness) and assembled in layers connected in electrical parallel arrangement to provide a suitable electrical energy and power package. In various other instances, the battery 20 may include electrodes 22, 24 that are connected in series.

Further, in certain aspects, the battery 20 may include a variety of other components that, while not depicted here, are nonetheless known to those of skill in the art. For instance, the battery 20 may include a casing, a gasket, terminal caps, and any other conventional components or materials that may be situated within the battery 20, including between or around the negative electrode 22, the positive electrode 24, and/or the solid-state electrolyte 26, by way of non-limiting example. As noted above, the size and shape of the battery 20 may vary depending on the particular applications for which it is designed. Battery-powered vehicles and hand-held consumer electronic devices are two examples where the battery 20 would most likely be designed to different size, capacity, and power-output specifications. The battery 20 may also be connected in series or parallel with other similar lithium-ion or sodium-ion cells or batteries to produce a greater voltage output, energy, and power if it is required by the load device 42.

Accordingly, the battery 20 can generate an electric current to the load device 42 that can be operatively connected to the external circuit 40. The load device 42 may be powered fully or partially by the electric current passing through the external circuit 40 when the battery 20 is discharging. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be a power-generating apparatus that charges the battery 20 for purposes of storing energy.

With further reference to FIG. 1, the solid-state electrolyte 26 provides electrical separation—preventing physical contact—between the negative electrode 22, i.e., an anode, and the positive electrode 24, i.e., a cathode. The solid-state electrolyte 26 also provides a minimal resistance path for internal passage of ions. In various aspects, as noted above, the first plurality of solid-state electrolyte particles 30 may define the solid-state electrolyte 26. For example, the solid-state electrolyte 26 may be in the form of a layer or a composite that comprises the first plurality of solid-state electrolyte particles 30. For example, the solid-state electrolyte 26 may be in the form of a layer having a thickness greater than or equal to about 1 μm to less than or equal to about 1 mm, and in certain aspects, optionally greater than or equal to about 1 μm to less than or equal to about 100 μm. Such solid-state electrolytes 26 may have an interparticle porosity 80 between the first plurality of solid-state electrolyte particles 30 that is greater than 0 vol. % to less than or equal to about 50 vol. %, greater than or equal to 1 vol. % to less than or equal to about 40 vol. %, or greater than or equal to about 2 vol. % to less than or equal to about 20 vol. %.

The first plurality of solid-state electrolyte particles 30 comprise a ceramic oxide, such as $Li_7La_3Zr_2O_{12}$ (LLZO), $Li_xLa_yTiO_3$ where $0<x<1$ and $0<y<1$ (LLTO), $Li_{1+x}Al_yTi_{2-y}PO_4$ where $0<x<1$ and $0<y<2$ (LATP), $Li_{2+2x}Zn_{1-x}GeO_4$ where $0<x<1$ (LISICON), $Li_3PO_2N$ (LIPON), sodium equivalents thereof, and combinations thereof, as non-limiting examples. "Sodium equivalents" of the oxide-based ceramic particles refers to the same chemical formulas, but having the Li replaced by Na. As an example, $Na_{2+2x}Zn_{1-x}GeO_4$ where $0<x<1$ (NASICON) is a sodium equivalent of LISICON. Also, as used herein, when a particle or component is "ceramic oxide-based," the particle or component comprises the ceramic oxide. In certain embodiments, the solid-state electrolyte particles 30 optionally comprise a dopant. As non-limiting examples, the dopant comprises aluminum (as $Al^{3+}$, from, for example, $Al_2O_3$), tantalum (as $Ta^{5+}$, from, for example, $TaCl_5$), niobium ($Nb^{5+}$, from, for example, $Nb(OCH_2CH_3)_5$), gallium ($Ga^{3+}$, from, for example, $Ga_2O_3$), indium ($In^{3+}$, from, for example, $In_2O_3$), tin ($Sn^{4+}$, from, for example, $SnO_4$), antimony ($Sb^{4+}$, from, for example, $Sb_2O_3$), bismuth ($Bi^{4+}$, from, for example, $Bi_2O_3$), yttrium ($Y^{3+}$, from, for example, $Y_2O_3$), germanium ($Ge^{4+}$, from, for example, $GeO_2$), zirconium ($Zr^{4+}$, from, for example, $ZrO_2$), calcium ($Ca^{2+}$, from, for example, $CaCl$), strontium ($Sr^{2+}$, from, for example, $SrO$), barium ($Ba^{2+}$, from, for example, $BaO$), hafnium ($Hf^{4+}$, from, for example, $HfO_2$), or combinations thereof. Therefore, the stoichiometry of the solid-state electrolyte particles 30 may change when a dopant is present. As used herein, unless indicated otherwise, the solid-state electrolyte particles include their doped variants, e.g., LLZO includes $Li_{7-3x-y}Al_xLa_3Zr_{2-y}M_yO_{12}$, where M is Ta and/or Nb, $0 \le x \le 1$, and $0 \le y \le 1$; $Li_{6.5}La_3Zr_{1.5}M_{0.5}O_{12}$, where M is Nb and/or Ta; $Li_{7-x}La_3Zr_{2-x}Bi_xO_{12}$, where $0 \le x \le 1$; and $Li_{6.5}Ga_{0.2}La_{2.9}Sr_{0.1}Zr_2O_{12}$, as non-limiting examples.

Ceramic oxide solid-state electrolyte particles 30 can be made by a solid-state combination of precursors using ball milling or through the synthesis of a sol-gel, where precursors are dissolved in a solvent, solidified, and dried. The milled or solidified precursors are then calcined (optionally in a die defining a predetermined shape) at a temperature of greater than or equal to about 700° C. to less than or equal to about 1200° C. to form a green, non-densified ceramic oxide solid-state electrolyte structure, which is optionally crushed into a powder. The green ceramic oxide solid-state electrolyte structure, shaped or in powder form, may react with atmospheric water and carbon dioxide and form a surface carbonate layer comprising a carbonate, such as $Li_2CO_3$, $Na_2CO_3$, $K_2CO_3$, $MgCO_3$, $CaCO_3$, or combinations thereof, that at least partially coats each solid-state electrolyte particle 30. Therefore, the carbonate layers often form on surfaces of solid-state electrolyte particles. Although the carbonate can be decomposed by sintering at a temperature of about 1000° C., doing so generates surface contaminates, such as electrically conductive carbon, which promotes dendrite formation. Therefore, methods of converting the carbonate layers into modified carbonate layers that conduct ions, such as lithium ions and sodium ions, without the need to decompose the carbonate are discussed below.

Figure 2:
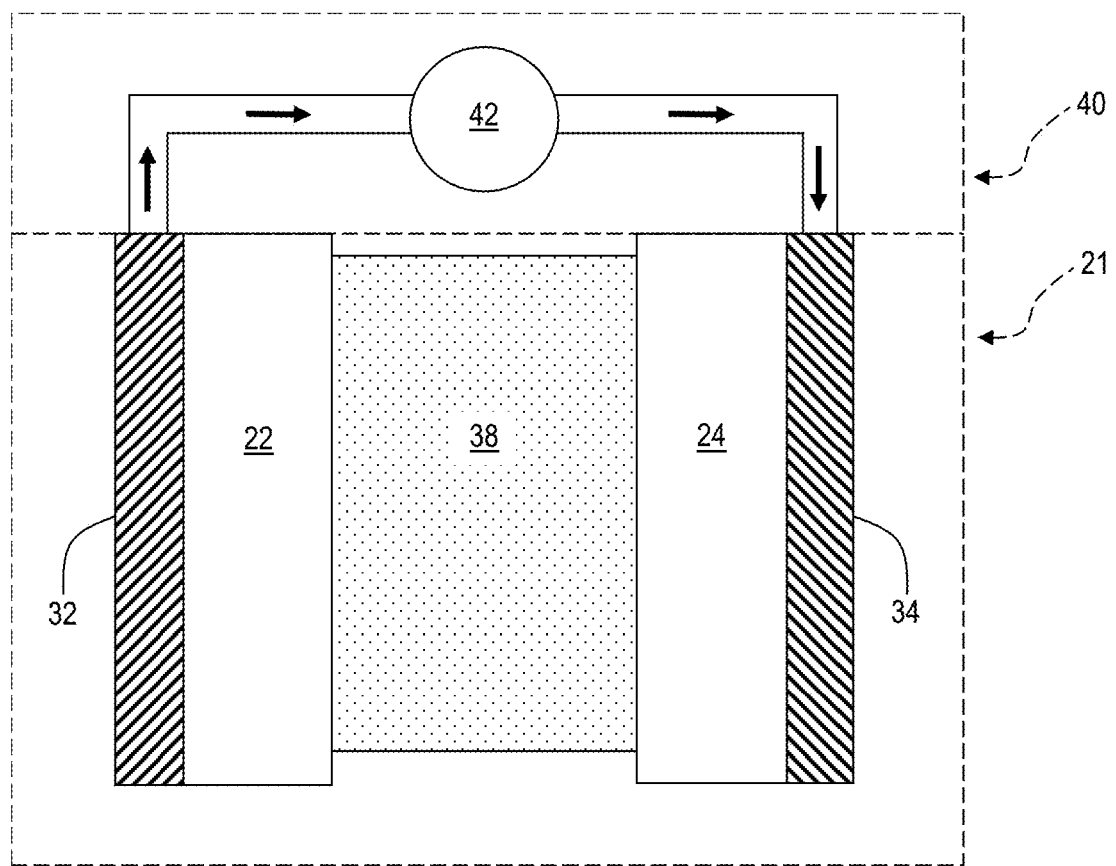
FIG. 2 is an illustration of a secondary battery with a liquid electrolyte in accordance with various aspects of the current technology.

With reference to FIG. 2, the current technology also considers a secondary battery 21 that cycles ions, such as lithium ions or sodium ions. The components of the battery 21 that have equivalent corresponding components in the battery 20 of FIG. 1 are labeled with the same numerals. As such, the battery 21 comprises the negative electrode 22, the negative electrode current collector 32, the positive electrode 24, and the positive electrode current collector 34. However, the battery 21 does not include a solid-state electrolyte. Rather, the battery 21 comprises a separator 38 disposed between the negative electrode 22 and the positive electrode 24. The separator 38 operates as an electrical insulator by being sandwiched between the negative electrode 22 and the positive electrode 24 to prevent physical contact and, thus, the occurrence of a short circuit. A liquid electrolyte solution is present throughout the separator and, optionally, in the negative electrode 22 and/or in the positive electrode 24. Therefore, in addition to providing a physical barrier between the electrodes 22, 24, the separator 38 acts like a sponge that contains the electrolyte solution in a network of open pores during the cycling of lithium/sodium ions to facilitate functioning of the battery 21. As discussed above, the chemical potential difference between the positive electrode 24 and the negative electrode 22 drives electrons produced by the oxidation of intercalated lithium or sodium at the negative electrode 22 through the external circuit 40 toward the positive electrode 24. Lithium/sodium ions, which are also produced at the negative electrode, are concurrently transferred through the liquid electrolyte solution contained in the separator 38 towards the positive electrode 24. The electrons flow through the external circuit 40 and the lithium or sodium ions migrate across the separator 38 containing the electrolyte solution to form intercalated lithium or sodium at the positive electrode 24.

The separator 38 operates as both an electrical insulator and a mechanical support. In one embodiment, a microporous polymeric separator 38 comprises a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP.

When the separator 38 is a microporous polymeric separator, it may be a single layer or a multi-layer laminate, which may be fabricated from either a dry or wet process. For example, in one embodiment, a single layer of the polyolefin may form the entire microporous polymer separator 38. In other aspects, the separator 38 may be a fibrous membrane having an abundance of pores extending between the opposing surfaces and may have a thickness of less than a millimeter, for example. As another example, multiple discrete layers of similar or dissimilar polyolefins may be assembled to form the microporous polymer separator 38. The polyolefins may be homopolymers (derived from a single monomer constituent) or heteropolymers (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), a blend of PE and PP, or multi-layered structured porous films of PE and/or PP. The microporous polymer separator 38 may also comprise other polymers in addition to the polyolefin, such as, but not limited to, polyethylene terephthalate (PET), polyvinylidene fluoride (PVDF), and/or a polyamide. Commercially available polyolefin porous membranes include CELGARD® 2500 (a monolayer polypropylene separator) and CELGARD® 2320 (a trilayer polypropylene/polyethylene/polypropylene separator), both available from Celgard, LLC. The polyolefin layer and any other optional polymer layers may further be included in the microporous polymer separator 38 as a fibrous layer to help provide the microporous polymer separator 38 with appropriate structural and porosity characteristics. Various conventionally available polymers and commercial products for forming the separator 38 are contemplated, as well as the many manufacturing methods that may be employed to produce such microporous polymer separators 38.

When a polymer, the separator 38 may be mixed with a ceramic material or its surface may be coated in a ceramic material. For example, a ceramic coating may include ceramic oxides such as alumina ($Al_2O_3$), silicon dioxide ($SiO_2$), titania ($TiO_2$), LLZO, LLTO, LATP, LISICON, LIPON, sodium equivalents thereof, or combinations thereof. In various alternative embodiments, instead of a polymeric material as discussed above, the separator 38 comprises a green ceramic oxide (i.e., a ceramic oxide that has not been sintered or otherwise densified) having a high porosity of greater than or equal to about 10 vol. % to less than or equal to about 50 vol. %.

Any appropriate liquid electrolyte solution capable of conducting lithium or sodium ions between the negative electrode 22 and the positive electrode 24 may be used in the battery 21. In certain aspects, the electrolyte solution may be a nonaqueous liquid electrolyte solution that includes a lithium or sodium salt dissolved in an organic solvent or a mixture of organic solvents. Numerous conventional non-aqueous liquid electrolyte solutions may be employed in the battery 21. A non-limiting list of salts that may be dissolved in an organic solvent to form the nonaqueous liquid electrolyte solution includes $LiPF_6$, LiFSi, $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, $Li(CF_3SO_2)_2N$, sodium equivalents thereof and combinations thereof. Sodium equivalents of the above salts are the same salts, but having the Li replaced by Na. For example, NaI is a sodium equivalent of LiI. These and other similar salts may be dissolved in a variety of organic solvents, including, but not limited to, various alkyl carbonates, such as cyclic carbonates (ethylene carbonate (EC), propylene carbonate (PC), butylene carbonate(BC)), acyclic carbonates (dimethyl carbonate (DMC), diethyl carbonate (DEC), ethyl methyl carbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof.

Referring back to FIG. 1, the negative electrode 22 may be formed from a lithium or sodium host material that is capable of functioning as a negative terminal of a lithium-ion battery or sodium-ion battery. For example, in certain variations, the negative electrode 22 may be defined by a plurality of negative solid-state electroactive particles 50. In certain instances, as illustrated, the negative electrode 22 is a composite comprising a mixture of the negative solid-state electroactive particles 50 and the second plurality of solid-state electrolyte particles 90. For example, the negative electrode 22 may include greater than or equal to about 10 wt. % to less than or equal to about 95 wt. %, and in certain aspects, optionally greater than or equal to about 50 wt. % to less than or equal to about 90 wt. %, of the negative solid-state electroactive particles 50 and greater than or equal to about 5 wt. % to less than or equal to about 90 wt. %, and in certain aspects, optionally greater than or equal to about 10 wt. % to less than or equal to about 40 wt. %, of the second plurality of solid-state electrolyte particles 90. Such negative electrodes 22 may have an interparticle porosity 82 between the negative solid-state electroactive particles 50 and/or the second plurality of solid-state electrolyte particles 90 that is greater than or equal to about 0 vol. % to less than or equal to about 20 vol. %. The second plurality of solid-state electrolyte particles 90 may be the same as or different from the first plurality of solid-state electrolyte particles 30.

In certain variations, the negative solid-state electroactive particles 50 may be lithium-based or sodium-based comprising, for example, a lithium or sodium alloy. In other variations, the negative solid-state electroactive particles 50 may be silicon-based comprising, for example, a silicon alloy. In still other variations, the negative electrode 22 may be a carbonaceous anode and the negative solid-state electroactive particles 50 may comprise one or more negative electroactive materials, such as graphite, graphene, and carbon nanotubes (CNTs). In still further variations, the negative electrode 22 may comprise one or more negative electroactive materials, such as lithium titanium oxide ($Li_4Ti_5O_{12}$) and sodium titanium oxide ($Na_4Ti_5O_{12}$); one or more metal oxides, such as $V_2O_5$; and metal sulfides, such as FeS.

Figure 3:
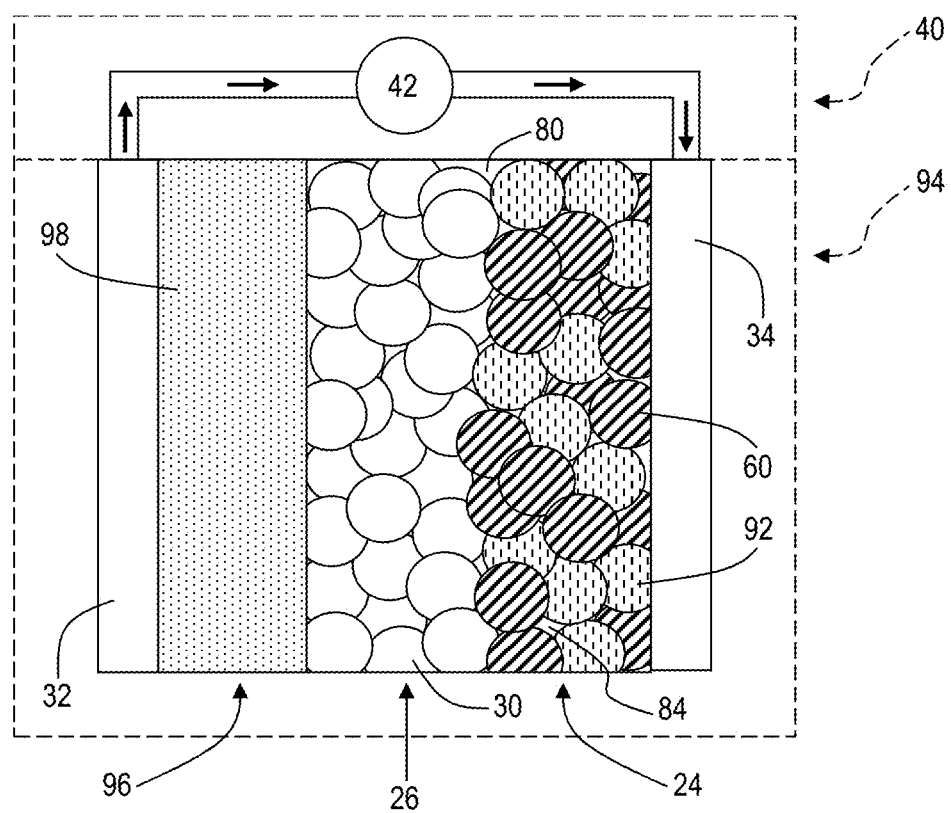
FIG. 3 is an illustration of a an all-solid-state metal battery in accordance with various aspects of the current technology.

An all-solid-state metal battery 94 is shown in FIG. 3. Components of the all-solid-state metal battery 94 share reference numerals with the battery 20 that cycles lithium or sodium ions of FIG. 1. Accordingly, the all-solid-state metal battery 94 has the same positive electrode 24, i.e., cathode, and solid-state electrolyte 26 as the battery 20 that cycles ions. However, the all-solid-state metal battery 94 has a negative electrode 96, i.e., anode, comprising a solid film 98 of lithium metal or sodium metal. Therefore, the negative electrode 96 does not comprise a composite material.

Referring back to FIG. 1, in certain variations, the negative solid-state electroactive particles 50 may be optionally intermingled with one or more electrically conductive materials that provide an electron conduction path and/or at least one polymeric binder material that improves the structural integrity of the negative electrode 22. For example, the negative solid-state electroactive particles 50 may be optionally intermingled with binders, like polyvinylidene difluoride (PVDF), polytetrafluoroethylene (PTFE), ethylene propylene diene monomer (EPDM) rubber, nitrile butadiene rubber (NBR), styrene-butadiene rubber (SBR), lithium polyacrylate (LiPAA), and/or sodium polyacrylate (NaPAA) binders. Electrically conductive materials may include, for example, carbon-based materials or a conductive polymer. Carbon-based materials may include, for example, particles of graphite, acetylene black (such as KETCHEN™ black or DENKA™ black), carbon fibers and nanotubes, graphene, and the like. Examples of a conductive polymer may include polyaniline, polythiophene, polyacetylene, polypyrrole, and the like. In certain variations, conductive additives may include, for example, one or more non-carbon conductive additives selected from simple oxides (such as $RuO_2$, $SnO_2$, ZnO, $Ge_2O_3$), superconductive oxides (such as $YBa_2Cu_3O_7$, $La_{0.75}Ca_{0.25}MnO_3$), carbides (such as $SiC_2$), silicides (such as $MoSi_2$), and sulfides (such as $CoS_2$).

In certain aspects, such as when the negative electrode 22 (i.e., anode) does not include lithium or sodium metal, mixtures of the conductive materials may be used. For example, the negative electrode 22 may include greater than or equal to about 0 wt. % to less than or equal to about 25 wt. %, optionally greater than or equal to about 0 wt. % to less than or equal to about 10 wt. %, and in certain aspects, optionally greater than or equal to about 0 wt. % to less than or equal to about 5 wt. % of the one or more electrically conductive additives and greater than or equal to about 0 wt. % to less than or equal to about 20 wt. %, optionally greater than or equal to about 0 wt. % to less than or equal to about 10 wt. %, and in certain aspects, optionally greater than or equal to about 0 wt. % to less than or equal to about 5 wt. % of the one or more binders. The negative electrode current collector 32 may be formed from copper or any other appropriate electrically conductive material known to those of skill in the art.

The positive electrode 24 may be formed from a lithium-based or sodium-based electroactive material that can undergo lithium/sodium intercalation and deintercalation while functioning as the positive terminal of the battery 20. For example, in certain variations, the positive electrode 24 may be defined by a plurality of positive solid-state electroactive particles 60. In certain instances, as illustrated, the positive electrode 24 is a composite comprising a mixture of the positive solid-state electroactive particles 60 and the third plurality of solid-state electrolyte particles 92. For example, the positive electrode 24 may include greater than or equal to about 10 wt. % to less than or equal to about 95 wt. %, and in certain aspects, optionally greater than or equal to about 50 wt. % to less than or equal to about 90 wt. %, of the positive solid-state electroactive particles 60 and greater than or equal to about 5 wt. % to less than or equal to about 70 wt. %, and in certain aspects, optionally greater than or equal to about 10 wt. % to less than or equal to about 30 wt. %, of the third plurality of solid-state electrolyte particles 92. Such positive electrodes 24 may have an interparticle porosity 84 between the positive solid-state electroactive particles 60 and/or the third plurality of solid-state electrolyte particles 92 that is greater than or equal to about 1 vol. % to less than or equal to about 20 vol. %, and optionally greater than or equal to 5 vol. % to less than or equal to about 10 vol. %. In various instances, the third plurality of solid-state electrolyte particles 92 may be the same as or different from the first and/or second pluralities of solid-state electrolyte particles 30, 90.

In various aspects, the positive electrode 24 may be one of a layered-oxide cathode, a spinel cathode, and a polyanion cathode. For example, in the instances of a layered-oxide cathode (e.g., rock salt layered oxides), the positive solid-state electroactive particles 60 may comprise one or more positive electroactive materials selected from $LiCoO_2$, $Li-Ni_xMn_yCo_{1-x-y}O_2$ (where $0 \leq x \leq 1$ and $0 \leq y \leq 1$), $LiNi_xMn_{1-x}O_2$ (where $0 \leq x \leq 1$), and $Li_{1+x}MO_2$ (where $0 \leq x \leq 1$) for solid-state lithium-ion batteries or $NaCoO_2$, $NaMnO_2$, $NaNi_xMn_yCo_{1-x-y}O_2$ (where $0 \leq x \leq 1$ and $0 \leq y \leq 1$), $NaNi_xMn_{1-x}O_2$ (where $0 \leq x \leq 1$), and $Na_{1+x}MO_2$ (where $0 \leq x \leq 1$) for solid-state sodium-ion batteries. The spinel cathode may include one or more positive electroactive materials, such as $LiMn_2O_4$ and $LiNi_xMn_{1.5}O_4$ for lithium-ion batteries and $NaMn_2O_4$ and $NaNi_xMn_{1.5}O_4$ for sodium-ion batteries. The polyanion cation may include, for example, a phosphate such as $LiFePO_4$, $LiVPO_4$, $LiV_2(PO_4)_3$, $Li_2FePO_4F$, $Li_3Fe_3(PO_4)_4$, or $Li_3V_2(PO_4)F_3$ for lithium-ion batteries; a phosphate such as $NaFePO_4$, $NaVPO_4$, $NaV_2(PO_4)_3$, $Na_2FePO_4F$, $Na_3Fe_3(PO_4)_4$, or $Na_3V_2(PO_4)F_3$ for sodium-ion batteries; and/or a silicate such as $LiFeSiO_4$ or $NaFeSiO_4$ for lithium-ion or sodium-ion batteries, respectively. In this fashion, in various aspects, the positive solid-state electroactive particles 60 may comprise one or more positive electroactive materials selected from the group consisting of $LiCoO_2$, $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), $Li_{1+x}MO_2$ (where $0 \leq x \leq 1$), $LiMn_2O_4$, $LiNi_xMn_{1.5}O_4$, $LiFePO_4$, $LiVPO_4$, $LiV_2(PO_4)_3$, $Li_2FePO_4F$, $Li_3Fe_3(PO_4)_4$, $Li_3V_2(PO_4)F_3$, $LiFeSiO_4$, and combinations thereof or $NaCoO_2$, $NaNi_xMn_yCo_{1-x-y}O_2$ (where $0 \leq x \leq 1$ and $0 \leq y \leq 1$), $NaNi_xMn_{1-x}O_2$ (where $0 \leq x \leq 1$), $Na_{1+x}MO_2$ (where $0 \leq x \leq 1$), $NaMn_2O_4$, $NaNi_xMn_{1.5}O_4$, $NaFePO_4$, $NaVPO_4$, $NaV_2(PO_4)_3$, $Na_2FePO_4F$, $Na_3Fe_3(PO_4)_4$, $Na_3V_2(PO_4)F_3$, $NaFeSiO_4$, and combinations thereof. In certain aspects, the positive solid-state electroactive particles 60 may be coated (for example, by $Al_2O_3$) and/or the positive electroactive material may be doped (for example, by magnesium).

In certain variations, the positive solid-state electroactive particles 60 may be optionally intermingled with one or more electrically conductive materials that provide an electron conduction path and/or at least one polymeric binder material that improves the structural integrity of the positive electrode 24. For example, the positive solid-state electroactive particles 60 may be optionally intermingled with binders, like polyvinylidene difluoride (PVDF), polytetrafluoroethylene (PTFE), ethylene propylene diene monomer (EPDM) rubber, nitrile butadiene rubber (NBR), styrene-butadiene rubber (SBR), lithium polyacrylate (LiPAA), and/or sodium polyacrylate (NaPAA) binders. Electrically conductive materials may include, for example, carbon-based materials, powdered nickel or other metal particles, or a conductive polymer. Carbon-based materials may include, for example, particles of graphite, acetylene black (such as KETCHEN™ black or DENKA™ black), carbon fibers and nanotubes, graphene, and the like. Examples of a conductive polymer may include polyaniline, polythiophene, polyacetylene, polypyrrole, and the like.

In certain aspects, mixtures of the conductive materials may be used. For example, the positive electrode 24 may include greater than or equal to about 0 wt. % to less than or equal to about 25 wt. %, optionally greater than or equal to about 0 wt. % to less than or equal to about 10 wt. %, and in certain aspects, optionally greater than or equal to about 0 wt. % to less than or equal to about 5 wt. % of the one or more electrically conductive additives and greater than or equal to about 0 wt. % to less than or equal to about 20 wt. %, optionally greater than or equal to about 0 wt. % to less than or equal to about 10 wt. %, and in certain aspects, optionally greater than or equal to about 0 wt. % to less than or equal to about 5 wt. % of the one or more binders. The positive electrode current collector 34 may be formed from aluminum or any other electrically conductive material known to those of skill in the art.

As a result of the interparticle porosity 80, 82, 84 between particles within the battery 20 (for example, the battery 20 in a green form may have a solid-state electrolyte interparticle porosity greater than or equal to about 10 vol. % to less than or equal to about 50 vol. %), direct contact between the solid-state electroactive particles 50, 60 and the pluralities of solid-state electrolyte particles 30, 90, 92 may be much lower than the contact between a liquid electrolyte and solid-state electroactive particles in comparable non-solid-state batteries. To improve contact between the solid-state electroactive particles and solid-state electrolyte particles, the amount of the solid-state electrolyte particles may be increased within the electrodes.

As discussed above, various electrochemical cell components comprise a ceramic oxide, such as $Li_7La_3Zr_2O_{12}$ (LLZO), $Li_xLa_yTiO_3$ where $0<x<1$ and $0<y<1$ (LLTO), $Li_{1+x}Al_yTi_{2-y}PO_4$ where $0<x<1$ and $0<y<2$ (LATP), $Li_{2+2x}Zn_{1-x}GeO_4$ where $0<x<1$ (LISICON), $Li_2PO_2N$ (LIPON), sodium equivalents thereof, or combinations thereof, which can optionally be doped. The electrochemical cell components are, as non-limiting examples, a solid-state electrolyte comprising the ceramic oxide, a separator comprising the ceramic oxide, a coating comprising the ceramic oxide disposed on a separator, a positive electrode comprising a positive electrode active material having a solid-state electrolyte comprising the ceramic oxide embedded therein, or a negative electrode comprising a negative electrode active material having a solid-state electrolyte comprising the ceramic oxide embedded therein. The ceramic oxide surfaces of the electrochemical cell components react with atmospheric water and carbon dioxide to form a surface carbonate layer comprising a carbonate, such as lithium carbonate ($Li_2CO_3$), sodium carbonate ($Na_2CO_3$), potassium carbonate ($K_2CO_3$), magnesium carbonate ($MgCO_3$), calcium carbonate ($CaCO_3$), or combinations thereof, which coats at least a portion of the electrochemical cell component. The carbonate layer does not adequately conduct ions and results in a high interfacial impedance. Although the carbonate of the carbonate layer can be decomposed by sintering at high temperatures of over 1000° C., this decomposition results in an additional loss of lithium and/or sodium (due to evaporation at this high temperature) and a generation of surface contaminants. One such surface contaminant is carbon, which is electronically conductive and promotes dendrite formation.

Accordingly, the current technology provides a method of modifying a carbonate layer formed on a surface of an electrochemical cell component, the surface comprising a ceramic oxide and the carbonate layer comprising a carbonate and being substantially non-conductive to lithium ions and sodium ions. As used herein, the term "substantially non-conductive to lithium ions and sodium ions" means that the solid-state electrolyte particles have a conductivity of less than or equal to about 0.01 mS. In various embodiments, the carbonate is $Li_2CO_3$, $Na_2CO_3$, or a combination thereof.

The method comprises contacting the carbonate layer with a modifying agent to form a mixture. The modifying agent comprises MX, where M is an alkali metal, e.g., Li, Na, K, or combinations thereof, and X is a halide, e.g., F, Cl, Br, I, or combinations thereof. Examples of MX include LiF, LiCl, LiBr, LiI, NaF, NaCl, NaBr, NaI, KF, KCl, KBr, KI, and combinations thereof. In some embodiments, the electrochemical cell component is a plurality of particles (e.g., solid-state electrolyte particles) in powder form, and the mixture is a solid mixture comprising the modifying agent and the plurality of particles in powder form. In other embodiments, the electrochemical cell component is a two-dimensional or three-dimensional structure (e.g., a solid-state electrolyte, a ceramic oxide separator, a polymeric separator comprising a ceramic oxide coating, or an electrode), and the mixture is a powder layer of the modifying agent disposed on the two-dimensional or three-dimensional structure.

The mixture comprises the modifying agent at a concentration of greater than or equal to about 0.5 wt. % to less than or equal to about 20 wt. %, greater than or equal to about 1 wt. % to less than or equal to about 10 wt. %, or greater than or equal to about 1.5 wt. % to less than or equal to about 5 wt. %, such as at a concentration of about 1 wt. %, about 2 wt. %, about 3 wt. %, about 4 wt. %, about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, or about 20 wt. %.

The method of contacting the carbonate layer with the modifying agent is not limited. In some embodiments, the contacting comprises adding the modifying agent in powder form to the electrochemical cell component comprising the ceramic oxide with the carbonate layer. In other embodiments, the modifying agent is added by atomic layer deposition. For example, LiF can be added by atomic layer deposition using lithium bis(trimethylsilyl)amide (LiHMDS) and anhydrous HF as precursors, using lithium 2,2,6,6-hexamethyl-3,5-heptanedionate (Lithd) and $TiF_4$ are as precursors, using lithium tert-butoxide (LiOtBu) and $TiF_4$ as precursors, or using magnesium 2,2,6,6-tertramethylheptane-3,5-dionate $(Mg(thd)_2)$, $TiF_4$, and Lithd as precursors, as non-limiting examples. NaF can be added using sodium equivalents of the above precursors. Therefore, the method can comprise adding MX powder to the electrochemical cell component in powder form. Alternatively, the method can comprise coating the electrochemical cell component with the modifying agent by atomic layer deposition.

The method then comprises causing the modifying agent to incorporate into the carbonate layer and to form a modified hybrid layer comprising a eutectic mixture of the modifying agent and the carbonate, the modified hybrid layer being conductive to ions, including lithium ions, sodium ions, or a combination of lithium and sodium ions.

In some embodiments, the causing the modifying agent to incorporate into the carbonate layer comprises heating the mixture at a temperature greater than or equal to about 300° C. to incorporate the modifying agent into the carbonate layer and to form the modified hybrid layer comprising the eutectic mixture of the modifying agent and the carbonate, the modified hybrid layer being conductive to ions.

In some embodiments, the ceramic oxide is in a green form, i.e., non-sintered and non-densified. When it is desired to generate the modified hybrid layer on an electrochemical cell component with a high porosity (up to about 50%), such as for a separator comprising the ceramic oxide or a non-densified ceramic oxide coating on a polymeric separator, the heating is performed at a non-sintering temperature of greater than or equal to about 300° C. to less than or equal to about 500° C. or greater than or equal to about 300° C. to less than or equal to about 400° C., such as at a temperature of about 300° C., about 310° C., about 320° C., about 340° C., about 350° C., about 360° C., about 370° C., about 380° C., about 390° C., about 400° C., about 410° C., about 420° C., about 440° C., about 450° C., about 460° C., about 470° C., about 480° C., about 490° C., or about 500° C. Heating within this temperature range results in the modified hybrid layer without substantially densifying the green ceramic oxide or otherwise decreasing the porosity of the green ceramic oxide. By "without substantially densifying," it is meant that the green ceramic oxide is densified to less than or equal to about 10% of the extent needed to fully densify the green ceramic oxide.

In other embodiments, it is desired to sinter and densify the green ceramic oxide, for example, to generate a solid-state electrolyte or a densified coating an a polymeric separator. Here, the sintering is performed at a sintering temperature greater than or equal to about 600° C. to less than or equal to about 1100° C., greater than or equal to about 650° C. to less than or equal to about 1050° C., greater than or equal to about 800° C. to less than or equal to about 1050° C., greater than or equal to about 900° C. to less than or equal to about 1050° C., greater than or equal to about 950° C. to less than or equal to about 1200° C., or greater than or equal to about 900° C. to less than or equal to about 980° C., such as at a temperature of about 600° C., about 613° C., about 620° C., about 650° C., about 700° C., about 750° C., about 800° C., about 850° C., about 900° C., about 950° C., about 1000° C., about 1050° C., about 1100° C., about 1150° C., or about 1200° C. Consequently, the sintering can be performed at a lower temperature relative to the temperature required to sinter the ceramic oxide without the modifying agent as discussed above.

The heating, including the sintering, incorporates the modifying agent, i.e., the MX, into the carbonate layer to yield the modified hybrid layer comprising the eutectic mixture. For example, whereas $Li_2CO_3$, as an exemplary carbonate, has a melting point of about 730° C. and LiF, as an exemplary modifying agent, has a melting point of about 848° C., the mixture of LiF and $Li_2CO_3$ has a melting point of about 613° C. Moreover, the eutectic mixture conducts lithium ions due to a space charge region. In particular, the electrochemical cell component comprising the modified hybrid layer has an ionic (e.g., $Li^+$ and/or $Na^+$) conductivity of greater than or equal to about 0.05 mS, greater than or equal to about 0.1 mS, or greater than or equal to about 1.5 mS. In some embodiments, the ionic conductivity is greater than or equal to about 0.05 mS and less than or equal to about 1.5 mS or greater than or equal to about 0.1 mS and less than or equal to about 1 mS.

The sintering consolidates or densifies the ceramic oxide. Therefore, the sintering incorporates the modifying agent into the carbonate layer to form the modified eutectic layers that are ion-conductive, and the MX serves as a sintering aid.

Because very little lithium/sodium is lost at temperatures below 1000° C., sintering at the relatively low temperature (relative to that needed to sinter, for example, LLZO without the MX) is advantageous.

Further, the heated but non-sintered or sintered ceramic oxide is substantially free of electronically conductive carbon residues. As used herein, the term "substantially free of" means that the solid-state electrolyte particles comprise less than or equal to about 2 wt. % or less than or equal to about 1 wt. % electronically conductive carbon residues. Therefore, the modified hybrid layer helps to prevent, inhibit, or minimize dendrite formation.

In some embodiments, for example, when the electrochemical cell component is in powder form (e.g., for the formation of a solid-state electrolyte), the method also comprises transferring the mixture to a die having a predetermined shape and pressing the mixture in the die. The heating is performed during the pressing. As a result of this hot pressing method, the electrochemical cell component comprising the modified hybrid layer has a predetermined shape. As non-limiting examples, the predetermined shape can be a wafer, a disk, a sheet, a parallelepiped, a cylinder, a cube, a sphere, or a pellet. When the three-dimensional shape cannot be used in an electrochemical cell, the method can include cutting or slicing the solid-state electrolyte structure to a suitable size and shape.

In some embodiments, the electrochemical cell component is a green ceramic oxide powder comprising a plurality of ceramic oxide-based solid-state electrolyte particles, wherein at least a portion of each solid-state electrolyte particle of the plurality is coated with the carbonate layer. Here, the method comprises heating the mixture at a non-sintering temperature to form the modified hybrid layer on a ceramic oxide separator or a non-densified ceramic coating on a polymeric separator or heating the mixture at a sintering temperature to form the modified hybrid layer on a solid-state electrolyte or a densified ceramic coating on a polymeric separator. The method can also comprise incorporating the electrochemical cell component into an electrochemical cell. Incorporating the electrochemical cell component into the electrochemical cell can include disposing the electrochemical cell component between a negative electrode comprising negative electrode active particles and a positive electrode comprising positive electrode active particles, wherein the negative electrode active particles and the positive electrode active articles are independently mixed with no electrolyte, with solid-state electrolyte particles, or with a liquid electrolyte solution.

In some embodiments, contacting the carbonate layer with a modifying agent and causing the modifying agent to incorporate into the carbonate layer are performed substantially simultaneously by atomic layer deposition. By "substantially simultaneously," it is understood that during atomic layer deposition, the MX precursors (as discussed above) first contact the carbonate layer and then react to form the MX incorporated in the carbonate layer. Therefore, the contacting and the incorporating may be separated by a very short amount of time that is less than or equal to about 5 seconds, less than or equal to about 2 seconds, or less than or equal to about 1 second, i.e., "substantially simultaneously."

Embodiments of the present technology are further illustrated through the following non-limiting example.

EXAMPLE

A method is performed to modify layers of $Li_2CO_3$ formed on surfaces of LLZO particles. A plurality of LLZO particles is obtained. At least a portion of each LLZO particle of the plurality is coated with a layer of $Li_2CO_3$. Therefore, the LLZO particles are substantially non-conductive to lithium ions.

As first controls, first pluralities of the LLZO particles in the form of discs are independently sintered at 1000° C., 1050° C., and 1100° C.

As second controls, second pluralities of the LLZO particles in parallelepiped form are independently sintered at 1000° C. and 1100° C.

As samples, LiF powder is added to third pluralities of the LLZO particles in parallelepiped form to form four mixtures. The LiF is added until a LiF concentration of 2 wt. % is achieved in each mixture. The four mixtures are independently sintered at 90° C., 950° C., 1000° C., and 1050° C.

Figure 4:
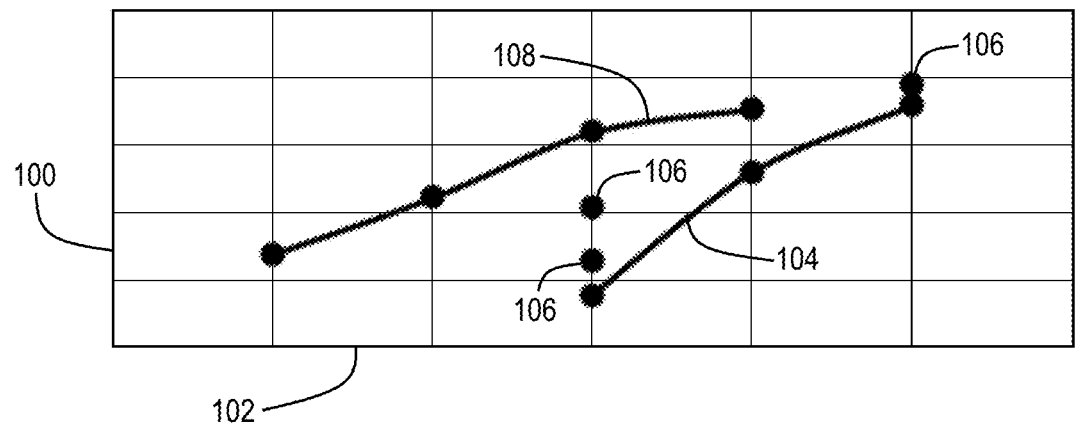
FIG. 4 is a graph showing relative densities of solid-state electrolytes made in accordance with various aspects of the current technology.

Density results are shown in FIG. 4. FIG. 4 is graph having a y-axis 100 representing relative density (relative to full dense LLZO from 0.8% to 1.05%) and an x-axis 102 representing temperature (from 850° C. to 1150° C.). Full dense is determined relative to the density of LLZO as measured by the dimensions of a unit cell X-ray diffraction and the stoichiometry. A first set of points generate a first line 104 representing the control LLZO particles in disc form. A second set of points 106 represent the control LLZO in parallelepiped form. A third set of points generate a second line 108 representing the samples. This graph demonstrates that a 50-1000° C. decrease in sintering temperature achieves the same density by hot pressing LLZO with the LiF. Put another way, sintering the LLZO with LiF generates higher densities at lower temperatures relative to either control. Therefore, adding LiF densifies the LLZO at lower temperatures than is required to obtain a similar density level without adding LiF.

Figure 5:
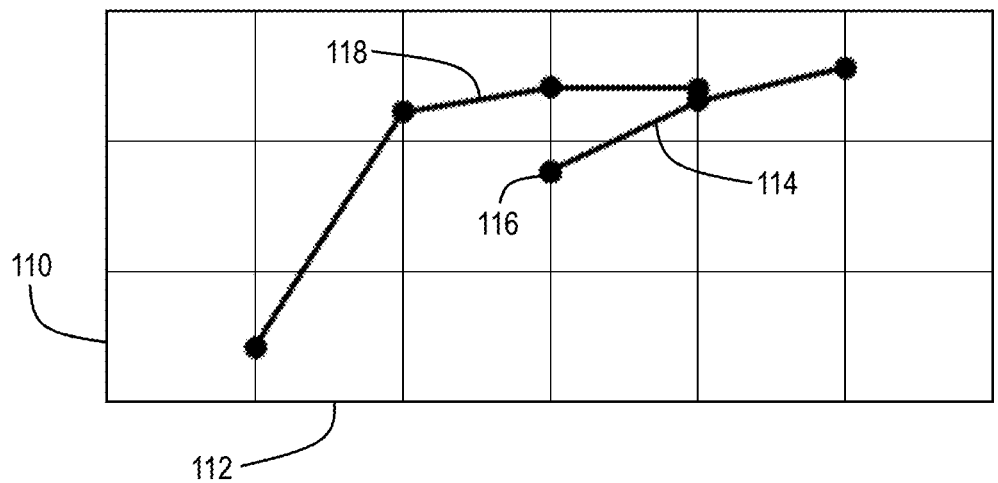
FIG. 5 is a graph showing bulk conductivities of solid-state electrolytes made in accordance with various aspects of the current technology Corresponding reference numerals indicate corresponding parts throughout the several views of the drawings.

Conductivity results are shown in FIG. 5. FIG. 5 is graph having a y-axis 110 representing bulk conductivity (from 0.001 to 1 mS) and an x-axis 112 representing temperature (from 850° C. to 1150° C.). A first set of points generate a first line 114 representing the control LLZO particles in disc form. A point 116 represents the control LLZO in parallelepiped form. A third set of points generate a second line 118 representing the samples. This graph demonstrates that LLZO with 2 wt. % sintered at 950-1050° C. has a similar conductivity to LLZO in disc form sintered between 1050-1100° C. Therefore, adding LiF generates lithium conductive LLZO at lower temperatures than is required to obtain a similar level of ionic conductivity without adding LiF.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of modifying a carbonate layer formed on a surface of an electrochemical cell component, the surface comprising a ceramic oxide and the carbonate layer comprising a carbonate and being substantially non-conductive to lithium ions, sodium ions, or a combination thereof, the method comprising:
   contacting the carbonate layer with a modifying agent to form a mixture; and causing the modifying agent to incorporate into the carbonate layer and to form a modified hybrid layer comprising a eutectic mixture of the modifying agent and the carbonate, the modified hybrid layer being conductive to lithium ions, sodium ions, or a combination thereof.

2. The method according to claim 1, wherein the modifying agent comprises MX, where M is an alkali metal and X is a halide.

3. The method according to claim 2, wherein the modifying agent comprises LiF or NaF.

4. The method according to claim 1, wherein the causing the modifying agent to incorporate into the carbonate layer comprises heating the mixture at a temperature greater than or equal to about 300° C.

5. The method according to claim 4, wherein the heating comprises heating the mixture at a temperature greater than or equal to about 300° C. to less than or equal to about 400° C.

6. The method according to claim 4, wherein the electrochemical cell component is a green solid-state electrolyte and the heating comprises sintering the mixture at a temperature greater than or equal to about 600° C. to less than or equal to about 1200° C. to form a densified solid-state electrolyte structure.

7. The method according to claim 6, wherein the green solid-state electrolyte comprises a plurality of ceramic oxide-based solid-state electrolyte particles in powder form, wherein at least a portion of each solid-state electrolyte particle of the plurality is coated with the carbonate layer.

8. The method according to claim 1, wherein the ceramic oxide comprises $Li_7La_3Zr_2O_{12}$ (LLZO), $Li_xLa_yTiO_3$ where $0<x<1$ and $0<y<1$ (LLTO), $Li_{1+x}Al_yTi_{2-y}PO_4$ where $0<x<1$ and $0<y<2$ (LATP), $Li_{2+2x}Zn_{1-x}GeO_4$ where $0<x<1$ (LISICON), $Li_2PO_2N$ (LIPON), sodium equivalents thereof, or combinations thereof and the ceramic oxide is optionally doped with aluminum, tantalum, niobium, gallium, indium, tin, antimony, bismuth, yttrium, germanium, calcium, strontium, barium, hafnium, or combinations thereof.

9. The method according to claim 1, wherein the carbonate comprises lithium carbonate ($Li_2CO_3$), sodium carbonate ($Na_2CO_3$), or a combination thereof.

10. The method according to claim 1, wherein the contacting and the causing the modifying agent to incorporate into the carbonate layer are performed substantially simultaneously by atomic layer deposition.

11. The method according to claim 1, wherein the electrochemical cell component comprising the modified hybrid layer is substantially free of electronically conductive carbon residues.

12. The method according to claim 1, further comprising:
pressing the mixture in a die defining a predetermined shape; and
performing the heating during the pressing.

13. The method according to claim 1, wherein the electrochemical cell component is a separator comprising the ceramic oxide or a coating comprising the ceramic oxide disposed on a polymeric separator.

14. The method according to claim 1, further comprising:
incorporating the electrochemical cell component into an electrochemical cell.

15. A method of modifying a carbonate layer formed on a surface of an electrochemical cell component, the surface comprising a ceramic oxide and the carbonate layer comprising lithium carbonate ($Li_2CO_3$), sodium carbonate ($Na_2CO_3$), or a combination thereof and being substantially non-conductive to lithium ions, sodium ions, or a combination thereof, the method comprising:
contacting the carbonate layer of with a modifying agent comprising MX, where M is Na or Li and X is a halide, to form a mixture;
pressing the mixture in a die defining a predetermined shape; and
during the pressing, heating the mixture at a temperature greater than or equal to about 300° C. to incorporate the MX into the carbonate layer and to form a modified hybrid layer comprising a eutectic mixture of the MX and the $Li_2CO_3$, $Na_2CO_3$, or combination thereof, the modified hybrid layer being conductive to lithium ions, sodium ions, or a combination thereof.

16. The method according to claim 15, wherein the predetermined shape is a wafer, a disk, a sheet, a parallelepiped, a cylinder, a cube, a sphere, or a pellet.

17. The method according to claim 15, wherein the electrochemical cell component is a solid-state electrolyte, a separator, a coating disposed on a separator, a positive electrode comprising a positive electrode active material having a solid-state electrolyte comprising the ceramic oxide embedded therein, or a negative electrode comprising a negative electrode active material having a solid-state electrolyte comprising the ceramic oxide embedded therein.

18. A method of modifying a carbonate layer formed on a surface of an electrochemical cell component, the surface comprising a ceramic oxide and the carbonate layer comprising lithium carbonate ($Li_2CO_3$), sodium carbonate ($Na_2CO_3$), or a combination thereof and being substantially non-conductive to ions, the method comprising:
contacting the carbonate layer of with a modifying agent comprising LiF, NaF, or a combination thereof to form a mixture; and
causing the modifying agent to incorporate into the carbonate layer and to form a modified hybrid layer comprising a eutectic mixture of the LiF, NaF, or the combination thereof and the carbonate, the modified hybrid layer having an ionic conductivity of greater than or equal to about 0.1 mS,
wherein the ceramic oxide is optionally doped and comprises $Li_7La_3Zr_2O_{12}$ (LLZO), $Li_xLa_yTiO_3$ where $0<x<1$ and $0<y<1$ (LLTO), $Li_{1+x}Al_yTi_{2-y}PO_4$ where $0<x<1$ and $0<y<2$ (LATP), $Li_{2+2x}Zn_{1-x}GeO_4$ where $0<x<1$ (LISICON), $Li_2PO_2N$ (LIPON), sodium equivalents thereof, or combinations thereof, and
wherein the electrochemical cell component is a solid-state electrolyte, a separator, or a coating disposed on a separator.

19. The method according to claim 18, wherein the causing the modifying agent to incorporate into the carbonate layer comprises heating the mixture at a temperature greater than or equal to about 300° C. or the contacting and the causing the modifying agent to incorporate into the carbonate layer are performed substantially simultaneously by atomic layer deposition.

20. The method according to claim 18, wherein the electrochemical cell component is a separator comprising the ceramic oxide, a coating comprising the ceramic oxide disposed on a polymeric separator, or a solid-state electrolyte comprising the ceramic oxide, and the method further comprises:
disposing the electrochemical cell component between a negative electrode comprising negative electrode active particles and a positive electrode comprising positive electrode active particles, wherein the negative electrode active particles and the positive electrode active articles are independently mixed with no electrolyte, with solid-state electrolyte particles, or with a liquid electrolyte solution.

* * * * *